Patented Oct. 20, 1936

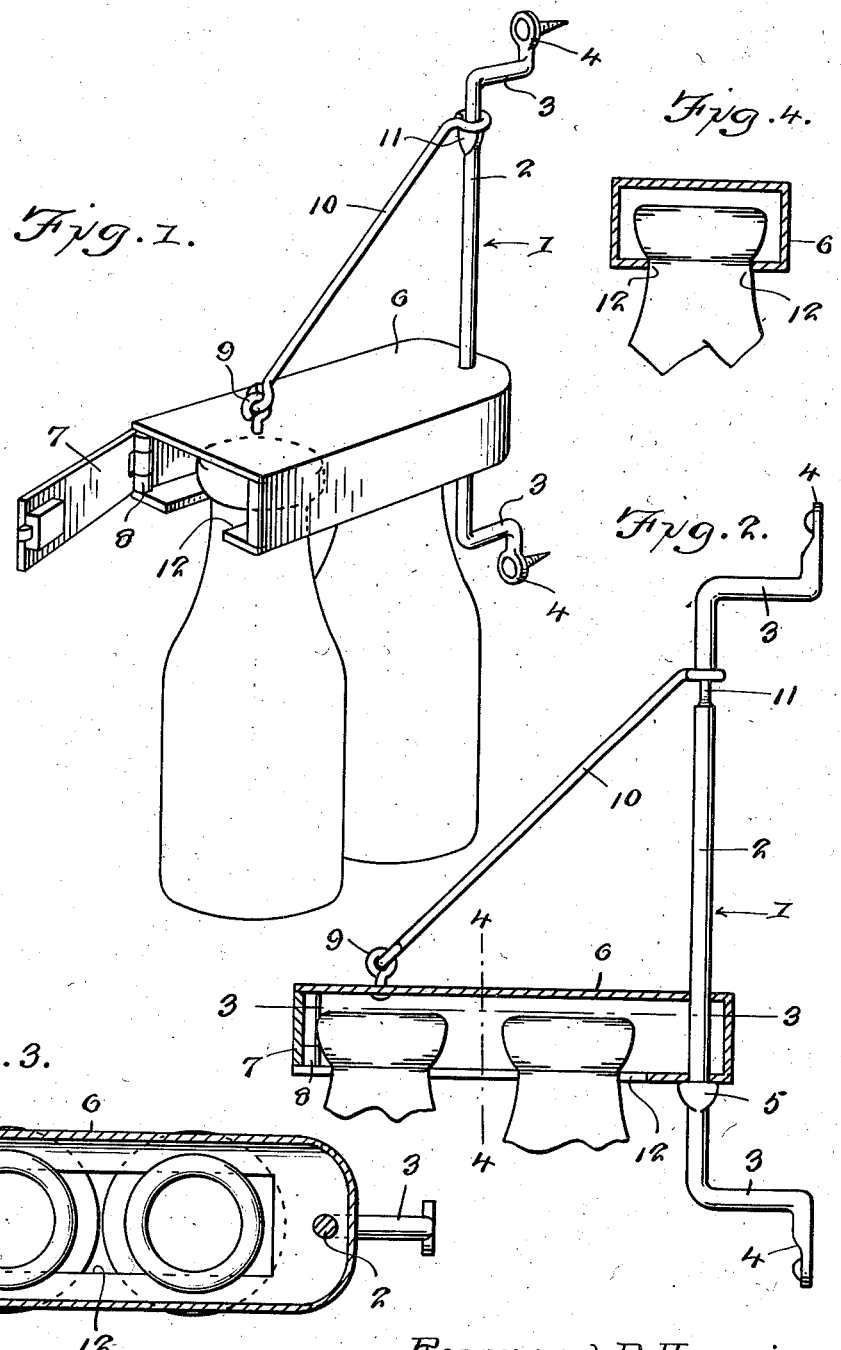

2,057,946

UNITED STATES PATENT OFFICE 2,057,946

SANITARY MILK PROTECTOR

Raymond P. Harris, Roanoke, Va., assignor of one-half to Frank L. Hodges, Roanoke, Va.

Application September 3, 1935, Serial No. 39,012

1 Claim. (Cl. 248—289)

This invention relates to milk bottle protectors and has for the primary object the provision of a device of this character to which milk bottles may be readily adapted or applied for securing said bottles against theft and for supporting said bottles so that animals will be prevented from contacting therewith.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a milk bottle supported by my invention.

Figure 2 is a side elevation, partly in section, illustrating the protector.

Figure 3 is a sectional view taken on the line 3—3 of Figure 2.

Figure 4 is a transverse sectional view taken on the line 4—4 of Figure 2.

Referring in detail to the drawing, the numeral 1 indicates a bracket consisting of a bar 2 having angularly related attaching legs 3 provided with apertured feet 4 to receive screws or like fasteners for securing the bracket 1 to a wall of a structure or any other supporting means. When the bracket 1 is secured to a support, the bar 2 is arranged vertically and is provided with an enlargement adjacent its lower end to form a bearing or journal 5. An elongated casing 6 is arranged at a right angle to the bar 2 and the upper and lower walls thereof are provided with aligned openings through which the bar 2 extends, the lower wall of said casing resting on the journal or bearing 5. One end of the casing is closed and the openings which receive the bar 2 are located adjacent said closed end. The opposite end of the casing is open to form a doorway adapted to be closed by a door 7 hinged to the casing, as shown at 8. The door 7 is equipped with a lock of any desired character for securing the door in a closed position.

An eyelet 9 is secured to the upper wall of the casing adjacent the doorway and has pivoted thereto a brace 10. The other end of the brace is journaled on the bar 2, the latter being provided with an enlargement 11 on which rests the journaled end of the brace. Thus it will be seen that the casing and brace are capable of swinging in either direction on the bar 2.

The lower wall of the casing has a slot 12 formed therein, which slot opens outwardly through one edge of said lower wall. The edge of the lower wall through which said slot extends is located at the open end of the casing. The width of the slot is sufficient to receive the necks of milk bottles while the beads of the necks rest upon or engage with the upper face of the lower wall, thereby supporting the bottles in the suspended position. With the door 7 in a closed position and secured in said position by the lock, it is impossible to remove the bottles from the casing and with the latter supported at a desired distance above the ground, animals will be prevented from contacting the bottle.

Having described the invention, I claim:

A sanitary milk protector comprising a milk bottle supporting casing having aligned openings arranged in opposite walls thereof, a rod extending through the openings and having the ends thereof angularly disposed thereto and secured to a support for positioning the rod vertically and the casing horizontally, spaced enlargements formed on the rod with the casing resting on one of said enlargements to limit the downward movement of the casing on said rod and to permit the casing to rotate in either direction on the rod, and a brace pivoted to the casing and journaled on the rod and resting on the other enlargement.

RAYMOND P. HARRIS.